(12) United States Patent
Tang

(10) Patent No.: US 11,432,175 B2
(45) Date of Patent: Aug. 30, 2022

(54) MEASUREMENT REPORTING CONTROL METHOD AND RELATED PRODUCT

(71) Applicant: GUANGDONG OPPO MOBILE TELECOMMUNICATIONS CORP., LTD., Guangdong (CN)

(72) Inventor: Hai Tang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 16/617,909

(22) PCT Filed: Aug. 11, 2017

(86) PCT No.: PCT/CN2017/097027
§ 371 (c)(1),
(2) Date: Nov. 27, 2019

(87) PCT Pub. No.: WO2019/028814
PCT Pub. Date: Feb. 14, 2019

(65) Prior Publication Data
US 2020/0196178 A1      Jun. 18, 2020

(51) Int. Cl.
*H04W 24/10* (2009.01)
*H04W 24/02* (2009.01)
*H04W 48/16* (2009.01)
*H04W 52/02* (2009.01)

(52) U.S. Cl.
CPC ............ *H04W 24/10* (2013.01); *H04W 24/02* (2013.01); *H04W 48/16* (2013.01); *H04W 52/0206* (2013.01)

(58) Field of Classification Search
CPC . H04W 24/10; H04W 24/02; H04W 52/0206; H04W 48/16; H04W 36/22; Y02D 30/70; H04L 5/005
See application file for complete search history.

(56) References Cited

U.S. PATENT DOCUMENTS

| 10,715,236 | B2 * | 7/2020 | Tang | H04B 7/088 |
| 10,886,990 | B2 * | 1/2021 | Wu | H04W 24/10 |
| 11,006,428 | B2 * | 5/2021 | Yum | H04W 24/10 |

(Continued)

FOREIGN PATENT DOCUMENTS

| CN | 101616434 | 12/2009 |
| CN | 102215511 | 10/2011 |

(Continued)

OTHER PUBLICATIONS

Nokia Corporation et al., "E-UTRA Measurement Control in GERAN," 3GPP TSG GERAN2#39, GP-081169, Aug. 2008, 4 pages.

(Continued)

*Primary Examiner* — Brian T O Connor
(74) *Attorney, Agent, or Firm* — Hodgson Russ LLP

(57) ABSTRACT

Disclosed in embodiments of the present disclosure are a measurement reporting control method and a related product, including: receiving, by a terminal, a preset signaling from a network device, wherein the preset signaling is used to activate or deactivate a measurement reporting function of the terminal; and controlling, by the terminal, reporting of a measurement report according to the preset signaling.

11 Claims, 6 Drawing Sheets

(56) References Cited

U.S. PATENT DOCUMENTS

| | | | |
|---|---|---|---|
| 11,121,754 B2* | 9/2021 | Kang | H04W 72/042 |
| 2012/0008524 A1 | 1/2012 | Amirijoo et al. | |
| 2013/0012188 A1* | 1/2013 | Gao | H04W 36/00837 |
| | | | 455/422.1 |
| 2013/0229931 A1* | 9/2013 | Kim | H04L 5/0053 |
| | | | 370/252 |
| 2013/0229940 A1 | 9/2013 | Baker et al. | |
| 2015/0358094 A1* | 12/2015 | Yi | H04B 17/318 |
| | | | 370/252 |
| 2018/0279169 A1* | 9/2018 | Wang | H04L 1/20 |
| 2019/0260449 A1* | 8/2019 | Wu | H04L 1/0026 |
| 2019/0261347 A1* | 8/2019 | Harada | H04W 24/10 |
| 2019/0327641 A1* | 10/2019 | Mok | H04W 4/40 |
| 2019/0357069 A1* | 11/2019 | Harada | H04W 36/0058 |
| 2019/0373614 A1* | 12/2019 | Yum | H04B 17/336 |
| 2020/0007299 A1* | 1/2020 | Han | H04L 5/0035 |
| 2020/0137604 A1* | 4/2020 | Chen | H04W 48/20 |
| 2020/0196178 A1* | 6/2020 | Tang | H04W 24/10 |
| 2020/0252192 A1* | 8/2020 | Gao | H04L 5/005 |

FOREIGN PATENT DOCUMENTS

| | | |
|---|---|---|
| CN | 103379536 | 10/2013 |
| CN | 104937980 | 9/2015 |
| CN | 106105350 | 11/2016 |
| CN | 106332174 | 1/2017 |
| CN | 106714232 | 5/2017 |
| WO | 2015051837 | 4/2015 |

OTHER PUBLICATIONS

EPO, Office Action for EP Application No. 17920640.4, dated Apr. 7, 2020.

WIPO, ISR for PCT/CN2017/097027, May 3, 2018.

"3rd Generation Partnership Project; Technical Specification Group Radio Access Network; Evolved Universal Terrestrial Radio Access (E-UTRA); Radio Resource Control (RRC); Protocol specification (Release 14)," 3GPP TS 36.331, Jun. 2017, v14.3.0, 745 pages.

INAPI, Office Action for CL Application No. 201903453, dated Apr. 19, 2021.

CNIPA, First Office Action for CN Application No. 202010425632. 8, dated Jul. 13, 2021.

IPI, Office Action for IN Application No. 201917054441, dated Jun. 22, 2021.

EPO, Communication for EP Application No. 17920640.4, dated Jan. 18, 2021.

EPO, Communication for EP Application No. 17920640.4, dated Dec. 13, 2021.

INAPI, Office Action for CL Application No. 201903453, dated Jan. 12, 2022.

ILPI, Office Action for IL Application No. 270633, dated Jan. 25, 2022.

CNIPA, Second Office Action for CN Application No. 202010425632. 8, dated Sep. 18, 2021.

DGIP, Office Action for ID Application No. P00202000098, dated Apr. 28, 2022.

* cited by examiner

MEASUREMENT REPORTING CONTROL METHOD AND RELATED PRODUCT

CROSS-REFERENCE TO RELATED APPLICATION

This application is a U.S. national phase application of International Application No. PCT/CN2017/097027, filed Aug. 11, 2017, the entire disclosure of which is incorporated herein by reference.

TECHNICAL FIELD

The present disclosure relates to the technical field of communications, and in particular, to a method for controlling measurement reporting and related products.

BACKGROUND

To ensure better communication quality, the network device needs to configure a neighboring cell for User Equipment (UE) to control the UE to switch to the neighboring cell when needing a cell handover.

In the Long Term Evolution (LTE) system, the main purpose of the measurement reporting of the terminal is based on the mobility of the network side control. The network side determines whether to initiate the handover according to the measurement reporting of the terminal, thereby ensuring the service continuity of the terminal user and the user's service experience. The reporting of the measurement report is controlled by an RRC configuration measurement.

SUMMARY

Embodiments of the present disclosure provide a method for controlling measurement reporting and related products, so as to reduce a signaling load of an air interface and reduce power consumption of the terminal.

In a first aspect, the embodiments of the present disclosure provide a method for controlling measurement reporting, including:

receiving, by a terminal, a preset signaling from a network device, wherein the preset signaling is used to activate or deactivate a measurement reporting function of the terminal; and controlling, by the terminal, reporting of a measurement report according to the preset signaling.

In a second aspect, the embodiments of the present disclosure provide a method for controlling measurement reporting, including:

sending, by a network device, a preset signaling, wherein the preset signaling is used by the terminal to activate or deactivate a measurement reporting function of the terminal to control reporting of a measurement report.

In a third aspect, the embodiments of the present disclosure provide a terminal, and the terminal has functions of implementing behaviors of the terminal in the foregoing method design. The functions may be implemented by hardware or by corresponding software implemented by hardware. The hardware or software includes one or more modules corresponding to the functions described above. In one possible design, the terminal includes a processor configured to support the terminal in performing the corresponding functions of the above methods. Further, the terminal may further include a transceiver for supporting communication between the terminal and the network device. Further, the terminal may also include a memory for coupling with the processor and storing program instructions and data necessary for the terminal.

In a fourth aspect, the embodiments of the present disclosure provide a network device, and the network device has functions of implementing behaviors of the network device in the foregoing method design. The functions may be implemented by hardware or by corresponding software implemented by hardware. The hardware or software includes one or more modules corresponding to the functions described above. In one possible design, the network device includes a processor configured to support the network device to perform corresponding functions in the methods described above. Further, the network device may further include a transceiver for supporting communication between the network device and the terminal. Further, the network device may also include a memory for coupling with the processor and storing program instructions and data necessary for the network device.

In a fifth aspect, the embodiments of the present disclosure provide a terminal, including a processor, a memory, a communication interface, and one or more programs, where the one or more programs are stored in the memory, and are configured to be executed by the processor, and the programs include instructions for performing the steps in any of the methods of the first aspect of the embodiments of the present disclosure.

In a sixth aspect, the embodiments of the present disclosure provide a network device, including a processor, a memory, a transceiver, and one or more programs, where the one or more programs are stored in the memory, and are configured to be executed by the processor, and the programs include instructions for performing the steps in any of the methods of the second aspect of the embodiments of the present disclosure.

In a seventh aspect, the embodiments of the present disclosure provide a computer readable storage medium, where the computer readable storage medium stores a computer program for electronic data exchange, and the computer program causes the computer to execute some or all of the steps described in any of the methods of the first aspect of the embodiments of the present disclosure.

In an eighth aspect, the embodiments of the present disclosure provide a computer readable storage medium, where the computer readable storage medium stores a computer program for electronic data exchange, and the computer program causes the computer to execute some or all of the steps described in any of the methods of the second aspect of the embodiments of the present disclosure.

In a ninth aspect, the embodiments of the present disclosure provide a computer program product, the computer program product includes a non-transitory computer readable storage medium storing a computer program, and the computer program is operative to cause a computer to execute some or all of the steps described in any of the methods of the first aspect of the embodiments of the present disclosure. The computer program product may be a software installation package.

In a tenth aspect, the embodiments of the present disclosure provide a computer program product, the computer program product includes a non-transitory computer readable storage medium storing a computer program, and the computer program is operative to cause a computer to execute some or all of the steps described in any of the methods of the second aspect of the embodiments of the present disclosure. The computer program product may be a software installation package.

It can be seen that, in the embodiments of the present disclosure, firstly, the terminal receives the preset signaling from the network device, the preset signaling being used to activate or deactivate the measurement reporting function of the terminal; and secondly, the terminal controls the reporting of the measurement report according to the preset signaling. The embodiments of the present disclosure reduce air interface signaling load and reduce power consumption of the terminal.

BRIEF DESCRIPTION OF THE DRAWINGS

The drawings required for describing the embodiments or the related art will be briefly described below.

DETAILED DESCRIPTION

Figure 1:
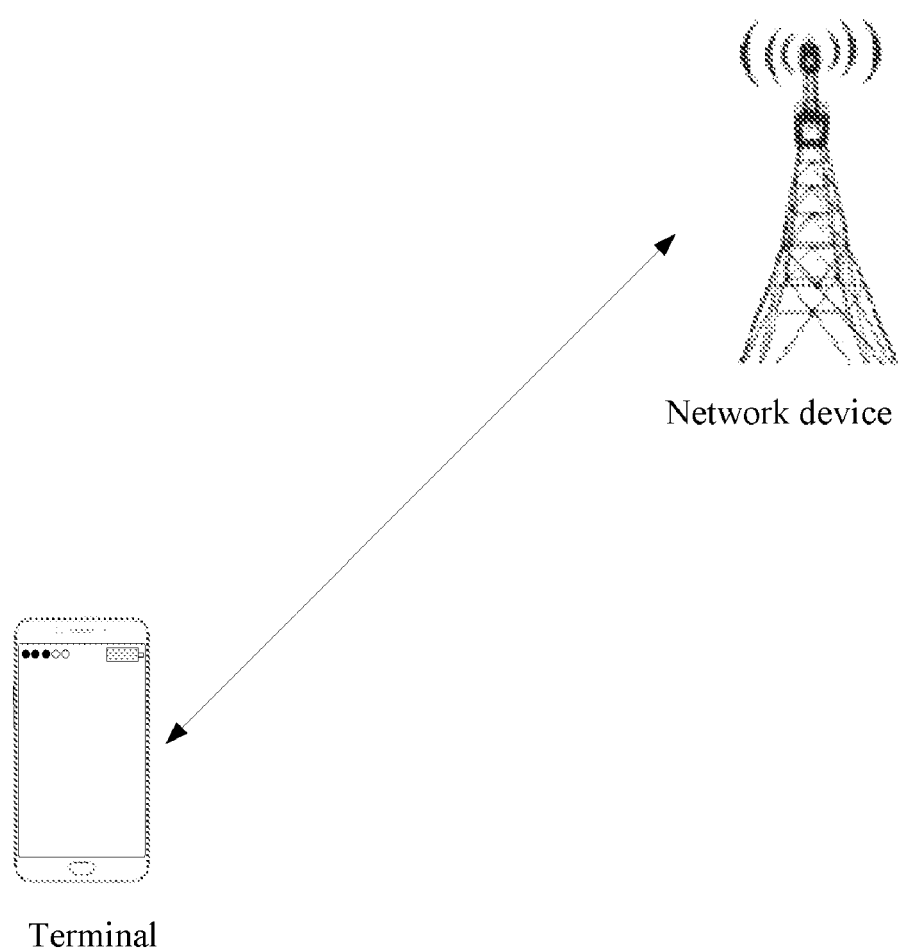
FIG. 1 is a network architecture diagram of a possible communication system provided by an embodiment of the present disclosure.

First, some concepts and general operation methods involved in the embodiments of the disclosure will be briefly explained.

The fifth generation of mobile communication technology (5th-Generation, 5G) New Radio (NR) is a newly proposed topic in the 3rd Generation Partnership Project (3GPP) organization. As the discussion of the new generation of 5G technology gradually deepens, on the one hand, because the communication system is backward compatible, the new technology developed later tends to be compatible with the previously standardized technology; while on the other hand, because there have been a large number of existing designs for the 4G LTE system, in order to achieve compatibility, a lot of flexibility of 5G has to be sacrificed, and the performance is reduced. Therefore, there are currently two parallel studies in the 3GPP organization, where the technical discussion group not considering the backward compatibility is called 5G NR.

The main application scenarios of 5G are: enhance Mobile Broadband (eMBB), Ultra-reliable and Low Latency Communications (URLLC), and massive machine type of communication (mMTC). Among them, eMBB still aims at obtaining multimedia content, services and data for the user, and its demand is growing rapidly. On the other hand, since eMBB may be deployed in different scenarios, such as indoors, urban areas, and rural areas, the differences in capabilities and demands are relatively large, in this case, it cannot be generalized and should be analyzed in detail in conjunction with specific deployment scenarios. The typical applications of URLLC include: industrial automation, power automation, telemedicine operations (surgery), and traffic safety. The typical features of mMTC include: high connection density, small data volume, delay-insensitive service, low cost and long life of the module, and the like.

In the 5G network environment, some of the above scenarios do not require the terminal to report the measurement result, although the measurement time is triggered or the measurement reporting period has arrived. For example, in a high-speed train scenario, the neighboring cell of the serving cell has only one cell. In the scenario of the conditional handover, the network side does not need to know the measurement result of the terminal, and the terminal only needs to autonomously switch to the target cell according to the measurement result in combination with the network side and the configured switching condition. For another example, in the mMTC scenario, due to the existence of a large number of connections of MTC devices, the measurement reporting is also massive, which has a great impact on the air interface signaling load, and this type of terminal may not require high mobility or high timeliness requirement of the service data. Therefore, the mobility problem may not be dealt with at this time, and it is possible to wait for the failure of the wireless link, and then to restore the connection through RRC connection reestablishment.

The technical solutions in the embodiments of the present disclosure will be described below with reference to the accompanying drawings.

FIG. 1 is a possible network architecture of an example communication system according to an embodiment of the present disclosure. Referring to FIG. 1, the example communication system may be, for example, a 5G NR system and other such communication systems. The example communication system specifically includes a network device and a terminal. When the terminal accesses the mobile communication network provided by the network device, the terminal and the network device may be communicated and connected by using a wireless link, and the communication connection mode may be a single connection mode or a dual connection mode or a multiple connection mode. When the communication connection mode is the single connection mode, the network device may be an LTE base station or an NR base station (also referred to as a gNB base station), and when the communication mode is the dual connection mode (specifically, it may be implemented by Carrier Aggregation (CA) technology, or a plurality of network devices), and the terminal is connected to a plurality of network devices, the plurality of network devices may be the primary base station MCG and the secondary base station SCG, and the base stations perform data backhaul through the backhaul link (backhaul). The primary base station may be an LTE base station, and the secondary base station may be an LTE base station, or the primary base station may be an NR base station, and the secondary base station may be an LTE base station, or the primary base station may be an NR base station, and the secondary base station may be an NR base station.

In the embodiments of the present disclosure, the terms "network" and "system" are often used interchangeably, and those skilled in the art can understand the meaning thereof. The terminals involved in the embodiments of the present disclosure may include various handheld devices, in-vehicle devices, wearable devices, computing devices having wireless communication function, or other processing devices connected to the wireless modem, and various forms of User Equipment (UE), Mobile Station (MS), terminal device, and the like. For convenience of description, the devices mentioned above are collectively referred to as terminals.

Figure 2:
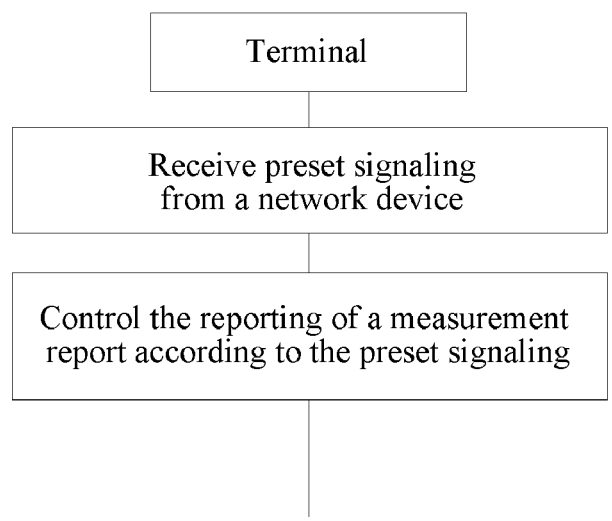
FIG. 2 is a schematic flowchart of a method for controlling measurement reporting provided by an embodiment of the present disclosure.

Referring to FIG. 2, which is a method for controlling measurement reporting provided by an embodiment of the present disclosure, the method is applied to the foregoing example communication system, and the method includes the following steps.

In section 201, the terminal receives preset signaling from the network device, the preset signaling being used to activate or deactivate a measurement reporting function of the terminal.

The control priority of the preset signaling is higher than the control priority of the radio resource control (RRC) measurement configuration. The RRC measurement configuration includes a measurement object, a measurement reporting, and other information.

In section 202, the terminal controls reporting of a measurement report according to the preset signaling.

It can be seen that, in the embodiments of the present disclosure, the terminal firstly receives the preset signaling from the network device, the preset signaling being used to activate or deactivate the measurement reporting function of the terminal; and secondly, the terminal controls reporting of the measurement report according to the preset signaling. It can be seen that, in the embodiments of the present disclosure, the terminal reports the measurement report under control of the network device, instead of relying entirely on the measurement reporting configuration on the RRC side, so as to prevent the terminal from frequently reporting the measurement report based on the measurement reporting configuration on the RRC side, which is beneficial to reduce the air interface signaling load and reduce the power consumption of the terminal.

In one possible example, the preset signaling includes first signaling, where the first signaling is used to indicate to deactivate the measurement reporting function of the terminal.

The measurement reporting function includes a periodic type measurement reporting function and an event type measurement reporting function.

In this possible example, the terminal controls the reporting of the measurement report according to the preset signaling, including: determining, by the terminal, that the measurement reporting function of the terminal is disabled within a preset time period according to the first signaling.

The preset time period may be configured by the network device or configured by the terminal, which is not limited herein.

In a possible example, the preset signaling includes second signaling, where the second signaling is used to indicate to activate the measurement reporting function of the terminal.

In this possible example, the terminal controls the reporting of the measurement report according to the preset signaling, including: determining, by the terminal, that the measurement reporting function of the terminal is enabled within a preset time period according to the second signaling.

The preset time period may be configured by the network device or configured by the terminal, which is not limited herein.

In a possible example, the type of the preset signaling includes any one of the following: a physical downlink control channel (PDCCH) signaling, a medium access control (MAC) control unit (CE), and radio resource control (RRC) signaling.

In a possible example, the number of bit of the field in the preset signaling for activating or deactivating the measurement reporting function of the terminal is 1.

Figure 3:
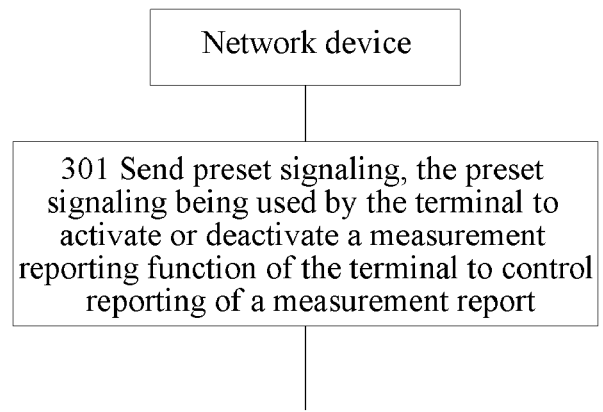
FIG. 3 is a schematic flowchart of another method for controlling measurement reporting provided by an embodiment of the present disclosure.

Referring to FIG. 3, which is a method for controlling measurement reporting provided by an embodiment of the present disclosure, the method is applied to the foregoing example communication system, and the method includes the following steps.

In section 301, the network device sends preset signaling, where the preset signaling is used by the terminal to activate or deactivate a measurement reporting function of the terminal to control reporting of a measurement report.

The network device may generate the preset signaling for the terminal according to at least one of the following information: a load condition of the network device, and/or a type of the terminal, and/or an environment in which the terminal is located, and the like, which is not limited here.

It can be seen that, in the embodiments of the present disclosure, the terminal firstly receives the preset signaling from the network device, the preset signaling being used to activate or deactivate the measurement reporting function of the terminal; and secondly, the terminal controls the reporting of the measurement report according to the preset signaling. It can be seen that, in the embodiments of the present disclosure, the terminal reports the measurement report under control of the network device, instead of relying entirely on the measurement reporting configuration on the RRC side, so as to prevent the terminal from frequently reporting the measurement report based on the measurement reporting configuration on the RRC side, which is beneficial to reduce the air interface signaling load and reduce power consumption of the terminal.

In a possible example, the preset signaling includes first signaling, where the first signaling is used to indicate to deactivate the measurement reporting function of the terminal.

The measurement reporting function includes a periodic type measurement reporting function and an event type measurement reporting function.

In a possible example, the first signaling is used by the terminal to disable the measurement reporting function of the terminal within a preset time period.

In a possible example, the preset signaling includes a second signaling, where the second signaling is used to indicate to activate the measurement reporting function of the terminal.

In a possible example, the second signaling is used by the terminal to enable the measurement reporting function of the terminal within a preset time period.

In a possible example, the type of the preset signaling includes any one of the following: a physical downlink control channel (PDCCH) signaling, a medium access control (MAC) control unit (CE), and radio resource control (RRC) signaling.

In one possible example, the number of bit of the field in the preset signaling for activating or deactivating the measurement reporting function of the terminal is 1.

Figure 4:
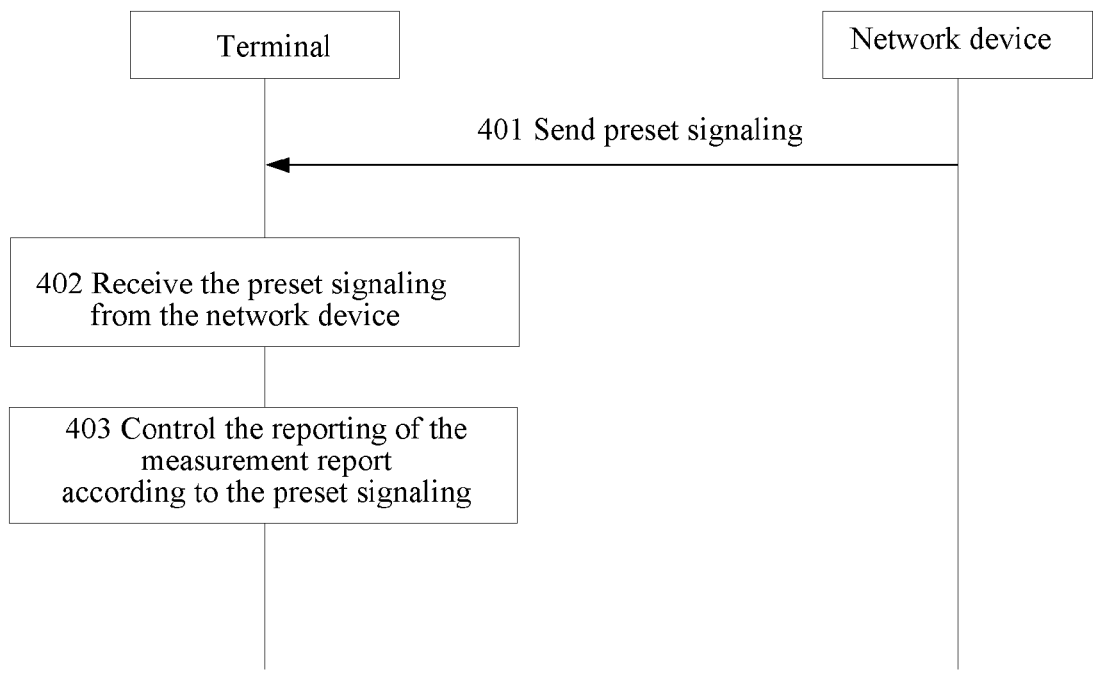
FIG. 4 is a schematic flowchart of another method for controlling measurement reporting provided by an embodiment of the present disclosure.

Consistent with the embodiments in FIG. 2 and FIG. 3, FIG. 4 is a method for controlling measurement reporting provided by an embodiment of the present disclosure. Referring to FIG. 4, the method is applied to the foregoing example communication system, and the method includes the following steps.

In section 401, the network device sends preset signaling, where the preset signaling is used by the terminal to activate or deactivate a measurement reporting function of the terminal to control reporting of a measurement report.

In section 402, the terminal receives the preset signaling from the network device, where the preset signaling is used to activate or deactivate the measurement reporting function of the terminal.

In section 403, the terminal controls reporting of a measurement report according to the preset signaling.

It can be seen that, in the embodiments of the present disclosure, the terminal firstly receives the preset signaling from the network device, the preset signaling being used to activate or deactivate the measurement reporting function of the terminal; and secondly, the terminal controls the reporting of the measurement report according to the preset signaling. It can be seen that, in the embodiments of the present disclosure, the terminal reports the measurement report under control of the network device, instead of relying entirely on the measurement reporting configuration on the RRC side, so as to prevent the terminal from frequently reporting the measurement report based on the measurement reporting configuration on the RRC side, which is beneficial to reduce the air interface signaling load and reduce power consumption of the terminal.

Figure 5:
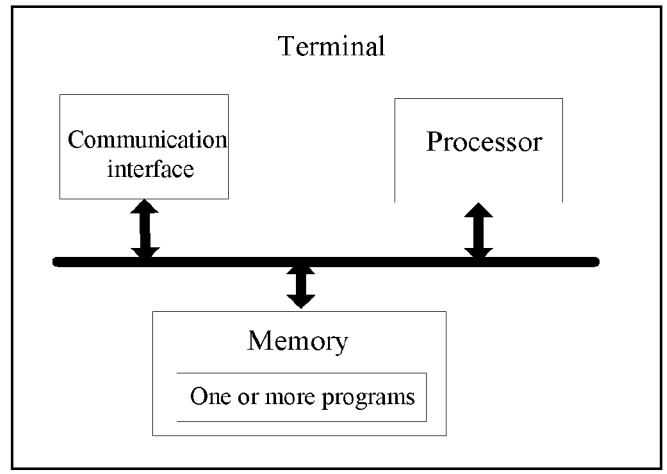
FIG. 5 is a schematic structural diagram of a terminal according to an embodiment of the present disclosure.

Consistent with the above embodiments, FIG. 5 is a schematic structural diagram of a terminal according to an embodiment of the present disclosure. As shown in FIG. 5, the terminal includes a processor, a memory, a communication interface, and one or more programs. The one or more programs are stored in the memory and configured to be executed by the processor, and the programs include instructions for performing the following steps:

receiving preset signaling from the network device, where the preset signaling is used to activate or deactivate a measurement reporting function of the terminal; and controlling reporting of a measurement report according to the preset signaling.

It can be seen that, in the embodiments of the present disclosure, the terminal firstly receives the preset signaling from the network device, the preset signaling being used to activate or deactivate the measurement reporting function of the terminal; and secondly, the terminal controls the reporting of the measurement report according to the preset signaling. It can be seen that, in the embodiments of the present disclosure, the terminal to reports the measurement report under control of the network device, instead of relying entirely on the measurement reporting configuration on the RRC side, so as to prevent the terminal from frequently reporting the measurement report based on the measurement reporting configuration on the RRC side, which is beneficial to reduce the air interface signaling load and reduce power consumption of the terminal.

In a possible example, the preset signaling includes first signaling, where the first signaling is used to indicate to deactivate the measurement reporting function of the terminal.

In a possible example, in the aspect of controlling the reporting of the measurement report according to the preset signaling, the instructions in the programs are specifically configured to perform the following operation: determining to disable the measurement reporting function of the terminal within a preset time period according to the first signaling.

In a possible example, the preset signaling includes a second signaling, where the second signaling is used to indicate to activate the measurement reporting function of the terminal.

In a possible example, in the aspect of controlling the reporting of the measurement report according to the preset signaling, the instructions in the programs are specifically configured to perform the following operation: determining to enable the measurement reporting function of the terminal within a preset time period according to the second signaling.

In a possible example, the type of the preset signaling includes any one of the following: a physical downlink control channel (PDCCH) signaling, a medium access control (MAC) control unit (CE), and radio resource control (RRC) signaling.

In a possible example, the number of bit of the field in the preset signaling for activating or deactivating the measurement reporting function of the terminal is 1.

Figure 6:
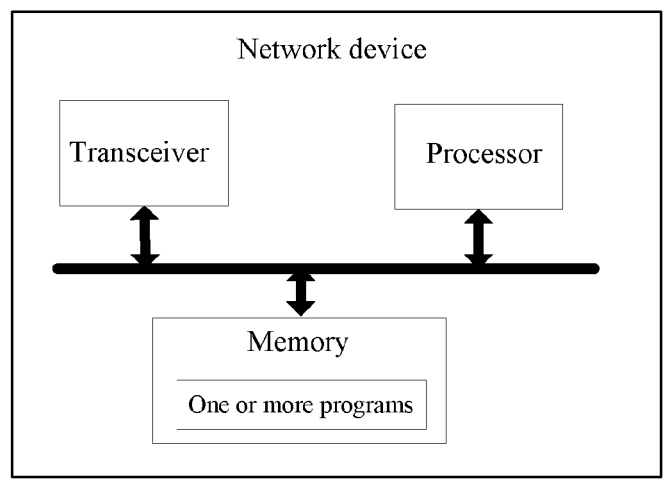
FIG. 6 is a schematic structural diagram of a network device according to an embodiment of the present disclosure.

Consistent with the above embodiments, FIG. 6 is a schematic structural diagram of a network device according to an embodiment of the present disclosure. As shown in FIG. 6, the network device includes a processor, a memory, a transceiver, and one or more programs. The one or more programs are stored in the memory and configured to be executed by the processor, and the programs include instructions for performing the following steps:

sending preset signaling, the preset signaling being used by the terminal to activate or deactivate a measurement reporting function of the terminal to control reporting of a measurement report.

It can be seen that, in the embodiments of the present disclosure, the network device sends the preset signaling, where the preset signaling is used to activate or deactivate the measurement reporting function of the terminal; and secondly, the network device controls the reporting of the measurement report according to the preset signaling. It can be seen that, in the embodiments of the present disclosure, the terminal reports the measurement report under control of the network device, instead of relying entirely on the measurement reporting configuration on the RRC side, so as to prevent the terminal from frequently reporting the measurement report based on the measurement reporting configuration on the RRC side, which is beneficial to reduce the air interface signaling load and reduce power consumption of the terminal.

In a possible example, the preset signaling includes first signaling, where the first signaling is used to indicate to deactivate the measurement reporting function of the terminal.

In a possible example, the first signaling is used by the terminal to disable the measurement reporting function of the terminal within a preset time period.

In a possible example, the preset signaling includes a second signaling, where the second signaling is used to indicate to activate the measurement reporting function of the terminal.

In a possible example, the second signaling is used by the terminal to enable the measurement reporting function of the terminal within a preset time period.

In a possible example, the type of the preset signaling includes any one of the following: a physical downlink control channel (PDCCH) signaling, a medium access control (MAC) control unit (CE), and radio resource control (RRC) signaling.

In a possible example, the number of bit of the field in the preset signaling for activating or deactivating the measurement reporting function of the terminal is 1.

The above mainly introduces the solutions of the embodiments of the present disclosure from the perspective of interaction between various network elements. It can be understood that, in order to realize the above-mentioned functions, the terminal and the network device include corresponding hardware structures and/or software modules for performing various functions, Those skilled in the art may be easily aware that, in combination with the exemplary units and algorithm steps described in the embodiments disclosed herein, the present disclosure may be implemented by hardware or a combination of hardware and computer software. Whether a certain function is executed by hardware or hardware driven by computer software depends on particular applications and design constraint conditions of the technical solutions. Those skilled in the art may use different methods to implement the described functions for each particular application, but it should not be deemed that the implementations go beyond the scope of the present disclosure.

The embodiments of the present disclosure may divide function units for the terminal and the network side device according to the above method examples, for instance, it is possible to divide each function unit corresponding to each function, or it is possible to integrate two or more functions into one processing unit. The integrated unit above may either be implemented in the form of hardware, or in the form of software program modules. It should be noted that the division of units in the embodiments of the present disclosure is schematic and is only a logical function division, and there may be other division modes in actual implementation.

Figure 7:
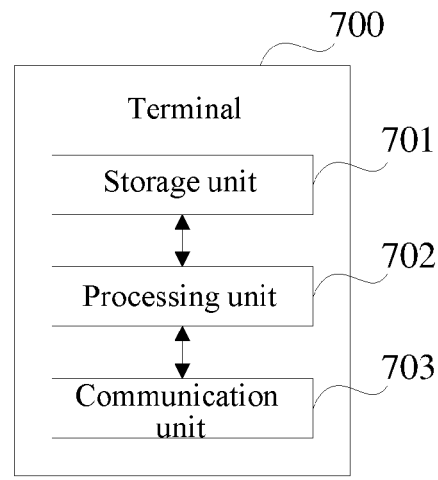
FIG. 7 is a block diagram of a functional unit composition of a terminal according to an embodiment of the present disclosure.

In the case of employing the integrated unit, FIG. 7 illustrates a block diagram of a possible functional unit composition of the terminal involved in the above embodiments. The terminal 700 includes a processing unit 702 and a communication unit 703. The processing unit 702 is used to control and manage actions of the terminal. For example, the processing unit 702 is used to support the terminal to perform steps 201, 202 in FIG. 2, steps 402, 403 in FIG. 4, and/or other processes for the techniques described herein. The communication unit 703 is used to support communications between the terminal and other devices, such as communication with the network side device shown in FIG. 5. The terminal may further include a storage unit 701 for storing program codes and data of the terminal.

The processing unit 702 may be a processor or a controller, for example, a Central Processing Unit (CPU), a general purpose processor, a Digital Signal Processor (DSP), an Application-Specific Integrated Circuit (ASIC), a Field Programmable Gate Array (FPGA), or other programmable logic device, transistor logic device, hardware components or any combination thereof. The processing unit may implement or execute various exemplary logical blocks, modules, and circuits described in connection with the present disclosure. The processor may also be a combination that implements computing functions, such as a combination that includes one or more microprocessors, a combination of DSP and the microprocessor, and the like. The communication unit 703 may be a transceiver, a transceiver circuit, etc., and the storage unit 701 may be a memory.

The processing unit 702 is configured to receive preset signaling from the network device by using the communication unit 703, where the preset signaling is used to activate or deactivate a measurement reporting function of the terminal; and control reporting of a measurement report according to the preset information.

In a possible example, the preset signaling includes first signaling, where the first signaling is used to indicate to deactivate the measurement reporting function of the terminal.

In a possible example, in the aspect of controlling the reporting of the measurement report according to the preset signaling, the processing unit 702 is specifically configured to: determine to disable the measurement reporting function of the terminal in a preset time period according to the first signaling.

In a possible example, the preset signaling includes a second signaling, where the second signaling is used to indicate to activate the measurement reporting function of the terminal.

In a possible example, in the aspect of controlling the reporting of the measurement report according to the preset signaling, the processing unit is configured to: determine to enable the measurement reporting function of the terminal a preset time period according to the second signaling.

In a possible example, the type of the preset signaling includes any one of the following: a physical downlink control channel (PDCCH) signaling, a medium access control (MAC) control unit (CE), and radio resource control (RRC) signaling.

In a possible example, the number of bit of the field in the preset signaling for activating or deactivating the measurement reporting function of the terminal is 1.

When the processing unit 702 is a processor, the communication unit 703 is a communication interface, and the storage unit 701 is a memory, the terminal involved in the embodiments of the present disclosure may be the terminal shown in FIG. 5.

Figure 8:
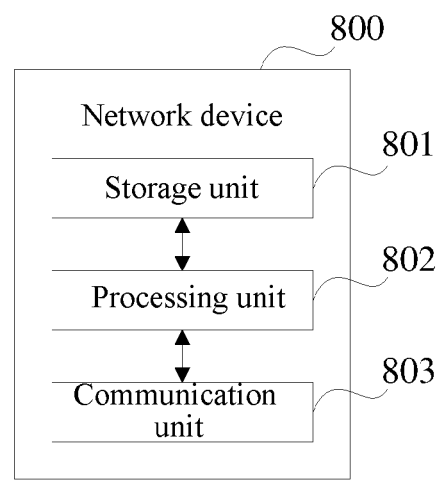
FIG. 8 is a structural block diagram of a functional unit composition of a network device according to an embodiment of the present disclosure.

In the case of employing the integrated unit, FIG. 8 illustrates a block diagram of a possible functional unit composition of the network device involved in the above embodiments. The network device 800 includes a processing unit 802 and a communication unit 803. The processing unit 802 is configured to control and manage actions of the network device. For example, the processing unit 802 is configured to support the network device to perform step 301 in FIG. 3, 401 in FIG. 4, and/or other processes for the techniques described herein. The communication unit 803 is used to support communications between the network device and other devices, such as communication with the terminal shown in FIG. 4. The network device may further include a storage unit 801 for storing program codes and data of the network device.

The processing unit 802 may be a processor or a controller, the communication unit 803 may be a transceiver, a transceiver circuit, a radio frequency chip, etc., and the storage unit 801 may be a memory.

The processing unit 802 is configured to send preset signaling by using the communication unit 803, where the preset signaling is used by the terminal to activate or deactivate a measurement reporting function of the terminal to control reporting of a measurement report.

In a possible example, the preset signaling includes first signaling, where the first signaling is used to indicate to deactivate the measurement reporting function of the terminal.

In a possible example, the first signaling is used by the terminal to disable the measurement reporting function of the terminal within a preset time period.

In a possible example, the preset signaling includes a second signaling, where the second signaling is used to indicate to activate the measurement reporting function of the terminal.

In a possible example, the second signaling is used by the terminal to enable the measurement reporting function of the terminal within a preset time period.

In a possible example, the type of the preset signaling includes any one of the following: a physical downlink control channel (PDCCH) signaling, a medium access control (MAC) control unit (CE), and radio resource control (RRC) signaling.

In a possible example, the number of bit of the field in the preset signaling for activating or deactivating the measurement reporting function of the terminal is 1.

When the processing unit 802 is a processor, the communication unit 803 is a communication interface, and the storage unit 801 is a memory, the network device involved in the embodiments of the present disclosure may be the network device shown in FIG. 6.

Figure 9:
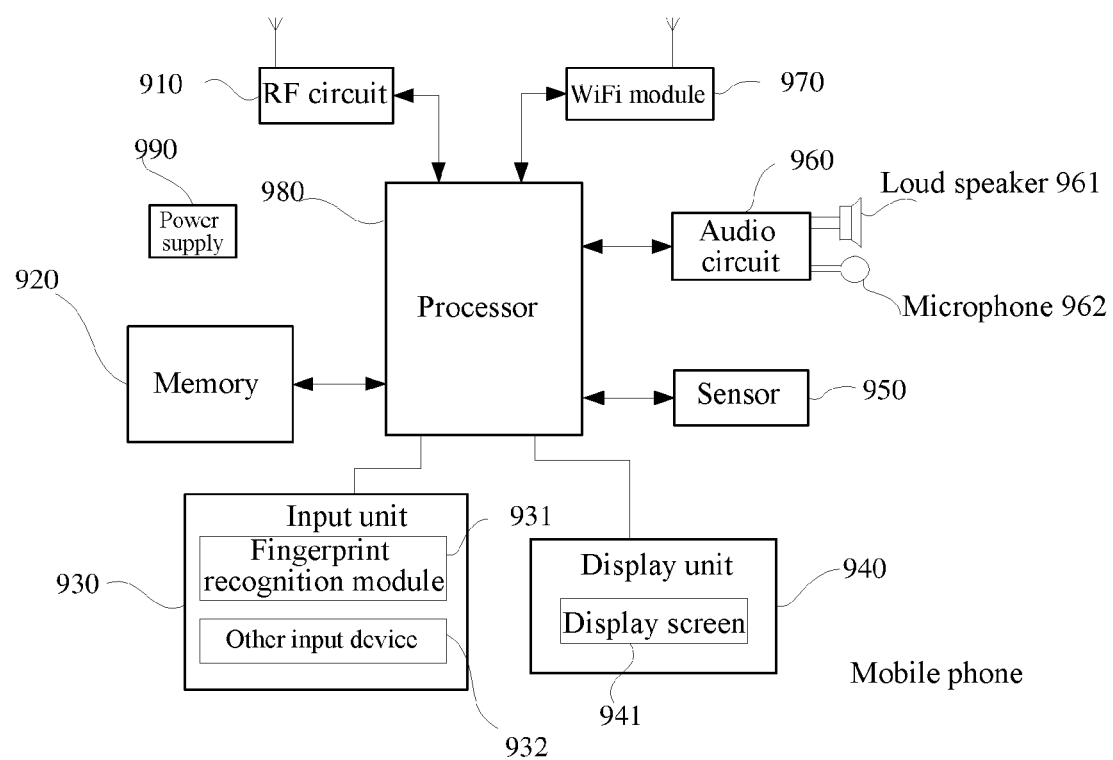
FIG. 9 is a schematic structural diagram of another terminal according to an embodiment of the present disclosure.

The embodiments of the present disclosure also provide another terminal as shown in FIG. 9. For ease of illustration, only the parts related to the embodiments of the present disclosure are shown. For the specific technical details which are not disclosed, please refer to the method parts of the embodiments of the present disclosure. The terminal may be any terminal device including a mobile phone, a tablet, a Personal Digital Assistant (PDA), a Point of Sales (POS), an on-board computer, and the like. The mobile phone is taken as the terminal for example.

FIG. 9 illustrates a block diagram of a partial structure of a mobile phone related to the terminal provided by the embodiments of the present disclosure. Referring to FIG. 9, the mobile phone includes: a Radio Frequency (RF) circuit 910, a memory 920, an input unit 930, a display unit 940, a sensor 950, an audio circuit 960, a Wireless Fidelity (WiFi) module 970, a processor 980, a power supply 990, and other components. Those skilled in the art can understand that the mobile phone structure shown in FIG. 9 does not constitute a limitation to the mobile phone, and the mobile phone may include more or less than the illustrated components, or combine some components, or have different component arrangements.

The following describes the various components of the mobile phone in details with reference to FIG. 9.

The RF circuit 910 may be configured to receive and send information. In general, the RF circuit 910 includes, but is not limited to, an antenna, at least one amplifier, a transceiver, a coupler, a Low Noise Amplifier (LNA), a duplexer, and the like. Moreover, the RF circuit 910 may also communicate with a network and other devices via wireless communications. The wireless communications above may use any communication standard or protocol, including but not limited to Global System of Mobile Communication (GSM), General Packet Radio Service (GPRS), Code Division Multiple Access (CDMA), Wideband Code. Division Multiple Access (WCDMA), Long Term Evolution (LTE), e-mail, Short Messaging Service (SMS), and the like.

The memory 920 may be configured to store software programs and modules. The processor 980 runs the software programs and modules stored in the memory 920 to perform various functional applications and data processing of the mobile phone. The memory 920 may mainly include a program storage region and a data storage region. The program storage region may store an operating system, and an application program required by at least one function, etc. The data storage region may store data and the like created according to the use of the mobile phone. In addition, the memory 920 may include a high-speed random access memory, and may also include a non-volatile memory, such as at least one disk memory device, a flash memory device, or other volatile solid storage devices.

The input unit 930 may be configured to receive input numeric or character information, and generate key signal inputs related to user settings and function control of the mobile phone. Specifically, the input unit 930 may include a fingerprint identification module 931 and other input device 932. The fingerprint identification module 931 may collect fingerprint data of the user thereon. In addition to the fingerprint identification module 931, the input unit 930 may also include other input device 932. To be specific, other input device 932 may include, but is not limited to, one or more of a touch screen, a physical keyboard, function keys (such as a volume control key, a switching key, etc.), a trackball, a mouse, a joystick, and the like.

The display unit 940 may be configured to display information input by the user or information provided to the user and various menus of the mobile phone. The display unit 940 may include a display screen 941. Optionally, the display screen 941 may be configured in the form of a Liquid Crystal Display (LCD), an Organic Light-Emitting Diode (OLED), or the like. Although in FIG. 9, the fingerprint identification module 931 and the display screen 941 are implemented as two separated components to implement the input and input functions of the mobile phone, in some embodiments, the fingerprint identification module 931 and the display screen 941 may be integrated to achieve the input and play functions of the mobile phone.

The mobile phone may also include at least one sensor 950 such as a light sensor, a motion sensor, and other sensors. Specifically, the light sensor may include an ambient light sensor and a proximity sensor. The ambient light sensor may adjust the brightness of the display screen 941 according to the brightness of the ambient light. The proximity sensor may turn off the display screen 941 and/or backlight when the mobile phone is moved close to an ear. As a motion sensor, an accelerometer sensor may detect the magnitude of acceleration in all directions (usually three axes), and may detect the magnitude and direction of gravity when stationary, and may be configured to identify the application of mobile phone attitude (such as horizontal and vertical screen switching, related games, and magnetometer attitude calibration), vibration recognition related functions (such as pedometer, and tap), etc. As for other sensors such as a gyroscope, a barometer, a hygrometer, a thermometer, and an infrared sensor, which can be configured in the mobile phone, they will not be elaborated herein.

An audio interface between the user and the mobile phone may be provided by the audio circuit 960, a loud speaker 961 and a microphone 962. The audio circuit 960 may convert the received audio data into an electrical signal and transmit the converted electrical signal to the loud speaker 961, and the electrical signal is converted to an acoustical signal and played by the loud speaker 961. On the other hand, the microphone 962 converts the collected acoustical signal into an electric signal, the audio circuit 960 receives the electric signal and converts it into audio data, then the audio data is processed by the playback processor 980, and then the audio data is sent to another mobile phone via the RF circuit 910, or the audio data is played to the memory 920 for further processing.

WiFi is a short-range wireless transmission technology. The mobile phone may help the user to send and receive e-mails, browse web pages, access streaming media, and the like via the WiFi module 970 which provides wireless wideband Internet access for the user. Although FIG. 9 illustrates the WiFi module 970, it can be understood that the WiFi module 970 does not belong to the necessary configuration of the mobile phone and may be omitted as necessary without changing the essence of the present disclosure.

The processor 980 is the control center of the mobile phone, and uses various interfaces and lines to connect various parts of the mobile phone, runs or executes software programs and/or modules stored in the memory 920, and calls data stored in the memory 920 to execute various functions of the mobile phone and process data, thus entirely monitoring the mobile phone. Optionally, the processor 980 may include one or more processing units. Preferably, the processor 980 may integrate an application processor and a modem processor, where the application processor mainly processes an operating system, a user interface, an application program, and the like, while the modem processor mainly processes wireless communications. It may be understood that the above modem processor may not be integrated into the processor 980.

The mobile phone further includes the power supply 990 (such as a battery) for supplying power to various components. Preferably, the power supply may be logically connected to the processor 980 through a power management system, thereby realizing functions of charging and discharging management, power consumption management and the like through the power management system.

Although not shown, the mobile phone may also include a camera, a bluetooth module, or the like, which will not be elaborated herein.

In the above embodiments shown in FIG. 2 to FIG. 4, the flow on the terminal side in each step method may be implemented based on the structure of the mobile phone.

In the above embodiments shown in FIG. 2 to FIG. 4, each unit function may be implemented based on the structure of the mobile phone.

The embodiments of the present disclosure further provide a computer readable storage medium, where the computer readable storage medium stores a computer program for electronic data exchange, and the computer program enables a computer to perform some or all of the steps described by the terminal in the above method embodiments.

The embodiments of the present disclosure further provide a computer readable storage medium, where the computer readable storage medium stores a computer program for electronic data exchange, and the computer program enables a computer to perform some or all of the steps described by the network device in the above method embodiments.

The embodiments of the present disclosure further provide a computer program product, where the computer program product includes a non-transitory computer readable storage medium storing a computer program operable to enable a computer to perform some or all of the steps described by the terminal in the above method embodiments. The computer program product may be a software install package.

The embodiments of the present disclosure further provide a computer program product, where the computer program product includes a non-transitory computer readable storage medium storing a computer program operable to enable a computer to perform some or all of the steps described by the network device in the above method embodiments. The computer program product may be a software install package.

The steps of the method or algorithms described in the embodiments of the present disclosure may be implemented in hardware or implemented in a form of executing software instructions by a processor. The software instructions may be composed of corresponding software modules, which may be stored in a Random Access Memory (RAM), a flash memory, a Read Only Memory (ROM), an Erasable Programmable ROM (EPROM), an Electrically Erasable Programmable Read-only Memory (EEPROM), a register, a hard disk, a mobile hard disk, a Compact Disc Read-only Memory (CD-ROM), or any other form of storage medium known in the art. An exemplary storage medium is coupled to the processor to enable the processor to read information from and write information to the storage medium. The storage medium may also be a part of the processor. The processor and the storage medium may be located in an ASIC. In addition, the ASIC may be located in an access network device, a target network device, or a core network device. The processor and the storage medium may also exist as discrete components in the access network device, the target network device or the core network device.

Those skilled in the art should aware that in one or more of the above examples, the functions described in the embodiments of the present disclosure may be implemented in whole or in part by software, hardware, firmware, or any combination thereof. When the functions are implemented using software, it may be implemented in whole or in part in the form of a computer program product. The computer program product includes one or more computer instructions. When the computer program instructions are loaded and executed on a computer, the processes or functions according to the embodiments of the present disclosure are generated in whole or in part. The computer may be a general purpose computer, a special purpose computer, a computer network, or other programmable apparatus. The computer instruction may be stored in a computer readable storage medium or transmitted from one computer readable storage medium to another computer readable storage medium, for example, the computer instruction may be transmitted from one website site, computer, server or data center to another website site, computer, server or data center by wired (e.g., coaxial cable, optical fiber, Digital Subscriber Line (DSL)) or wireless (e.g., infrared, wireless, microwave, etc) manners. The computer readable storage medium may be any available medium that a computer can access or a data storage device such as a server, a data center, or the like that includes one or more available media integration. The available medium may be a magnetic medium (e.g., a floppy disk, a hard disk, a magnetic tape), an optical medium (e.g., a Digital Video Disc (DVD)), or a semiconductor medium (e.g., a Solid status Disk (SSD)) or the like.

The specific embodiments described above have further explained the objects, technical solutions and beneficial effects of the embodiments of the present disclosure in detail. It should be understood that the above is only the specific embodiments of the embodiments of the present disclosure and is not intended to limit the protection scope of the embodiments of the present disclosure. Any modification, equivalent substitution, improvement, etc. made on the basis of the technical solutions of the embodiments of the present disclosure shall be included in the protection scope of the embodiments of the present disclosure.

What is claimed is:

1. A method for controlling measurement reporting, comprising:

receiving, by a terminal, a preset signaling from a network device, wherein the preset signaling is used to activate or deactivate a measurement reporting function of the terminal; and controlling, by the terminal, reporting of a measurement report according to the preset signaling;

wherein the preset signaling contains a first signaling and a second signaling, and the first signaling is used to indicate to deactivate the measurement reporting function of one measurement of the terminal;

wherein the second signaling is used to indicate to activate the measurement reporting function of another measurement of the terminal, and wherein a type of the preset signaling is a medium access control (MAC) control unit (CE);

wherein a control priority of the preset signaling is higher than a control priority of a radio resource control (RRC) measurement configuration.

2. The method according to claim 1, wherein the controlling, by the terminal, reporting of the measurement report according to the preset signaling, comprises:
   determining, by the terminal, that the measurement reporting function of the terminal is disabled within a preset time period according to the first signaling.

3. The method according to claim 1, wherein the controlling, by terminal, reporting of the measurement report according to the preset signaling, comprises:
   determining, by the terminal, that the measurement reporting function of the terminal is enabled within a preset time period according to the second signaling.

4. The method according to claim 1, wherein a bit number of a field in the preset signaling for activating or deactivating the measurement reporting function of the terminal is 1.

5. A terminal, comprising: a processor, a memory, a communication interface, and one or more programs, wherein the one or more programs are stored in the memory and configured to be executed by the processor to perform:
   receiving a preset signaling from a network device, wherein the preset signaling is used to activate or deactivate a measurement reporting function of the terminal; and
   controlling reporting of a measurement report according to the preset signaling;
   wherein the preset signaling contains a first signaling and a second signaling, and the first signaling is used to indicate to deactivate the measurement reporting function of one measurement of the terminal;
   wherein the second signaling is used to indicate to activate the measurement reporting function of another measurement of the terminal, and wherein a type of the preset signaling is a medium access control (MAC) control unit (CE);
   wherein a control priority of the preset signaling is higher than a control priority of a radio resource control (RRC) measurement configuration.

6. The terminal according to claim 5, wherein the processor is further configured to perform:
   determining that the measurement reporting function of the terminal is disabled within a preset time period according to the first signaling.

7. The terminal according to claim 5, wherein the processor is further configured to perform:
   determining that the measurement reporting function of the terminal is enabled within a preset time period according to the second signaling.

8. The terminal according to claim 5, wherein a bit number of a field in the preset signaling for activating or deactivating the measurement reporting function of the terminal is 1.

9. A network device, comprising: a processor, a memory, a transceiver, and one or more programs, wherein the one or more programs are stored in the memory and configured to be executed by the processor to perform:
   sending a preset signaling to a terminal, wherein the preset signaling is used to activate or deactivate a measurement reporting function of the terminal to control reporting of a measurement report;
   wherein the preset signaling contains a first signaling and a second signaling, and the first signaling is used to indicate to deactivate the measurement reporting function of one measurement of the terminal;
   wherein the second signaling is used to indicate to activate the measurement reporting function of another measurement of the terminal, and wherein a type of the preset signaling is a medium access control (MAC) control unit (CE);
   wherein a control priority of the preset signaling is higher than a control priority of a radio resource control (RRC) measurement configuration.

10. The network device according to claim 9, wherein the first signaling is used by the terminal to disable the measurement reporting function of the terminal within a preset time period.

11. The network device according to claim 9, wherein the second signaling is used by the terminal to enable the measurement reporting function of the terminal within a preset time period.

* * * * *